US009561519B2

(12) United States Patent
Zou et al.

(10) Patent No.: US 9,561,519 B2
(45) Date of Patent: Feb. 7, 2017

(54) AUTOMATIC TURNING DEVICE AND SPRAYING SYSTEM USING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Wen-Long Zou, Shenzhen (CN); Miao-Fang Qian, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 251 days.

(21) Appl. No.: 14/445,211

(22) Filed: Jul. 29, 2014

(65) Prior Publication Data
US 2015/0027850 A1 Jan. 29, 2015

(30) Foreign Application Priority Data

Jul. 29, 2013 (CN) .......................... 2013 1 0321646

(51) Int. Cl.
*B65G 17/00* (2006.01)
*B05B 13/02* (2006.01)
*B05B 13/04* (2006.01)
*B65G 47/248* (2006.01)

(52) U.S. Cl.
CPC ....... *B05B 13/0235* (2013.01); *B05B 13/0447* (2013.01); *B65G 47/248* (2013.01)

(58) Field of Classification Search
None
See application file for complete search history.

(56) References Cited

U.S. PATENT DOCUMENTS

| 3,421,924 | A | * | 1/1969 | Harlam | B05B 13/0235 118/314 |
| 3,684,078 | A | * | 8/1972 | Nielsen | B65G 17/485 118/322 |
| 5,419,427 | A | * | 5/1995 | Wurgler | B65G 47/908 198/803.12 |
| 6,090,444 | A | * | 7/2000 | Wixon | C23C 14/505 118/715 |

FOREIGN PATENT DOCUMENTS

TW         M432813 U1     7/2012

* cited by examiner

*Primary Examiner* — Charles Capozzi
(74) *Attorney, Agent, or Firm* — Zhigang Ma

(57) ABSTRACT

A spraying system includes a spraying device, a toasting device, a conveyor line, and a turning device. The spraying device is configured to spray a workpiece. The toasting device is configured to toast the workpiece. The conveyor line passes through the spraying device and the toasting device and is configured to convey the workpiece. The turning device is coupled to the conveyor line and includes a first fixing frame across the conveyor line, a turning mechanism, and a blocking member. The turning mechanism includes a bearing frame detachably coupled to the conveyor line, a rotation shaft rotatably coupled to the bearing frame; a rotatable member coupled to the rotation shaft; and a positioning member coupled to the rotation shaft and configured to couple the workpiece. The blocking member is coupled to the fixing frame and configured to block the rotatable member to rotate the rotation shaft, the positioning member.

16 Claims, 5 Drawing Sheets

AUTOMATIC TURNING DEVICE AND SPRAYING SYSTEM USING THE SAME

FIELD

The subject matter herein generally relates to an automatic turning device and a spraying system using the automatic turning device.

BACKGROUND

In automatic spraying, a spraying system can include a spraying device and a toasting device, to spray and toast workpieces. The workpieces can be conveyed to the spraying device and the toasting device by a conveyor line.

BRIEF DESCRIPTION OF THE DRAWINGS

Implementations of the present technology will now be described, by way of example only, with reference to the attached figures.

DETAILED DESCRIPTION

Figure 1:
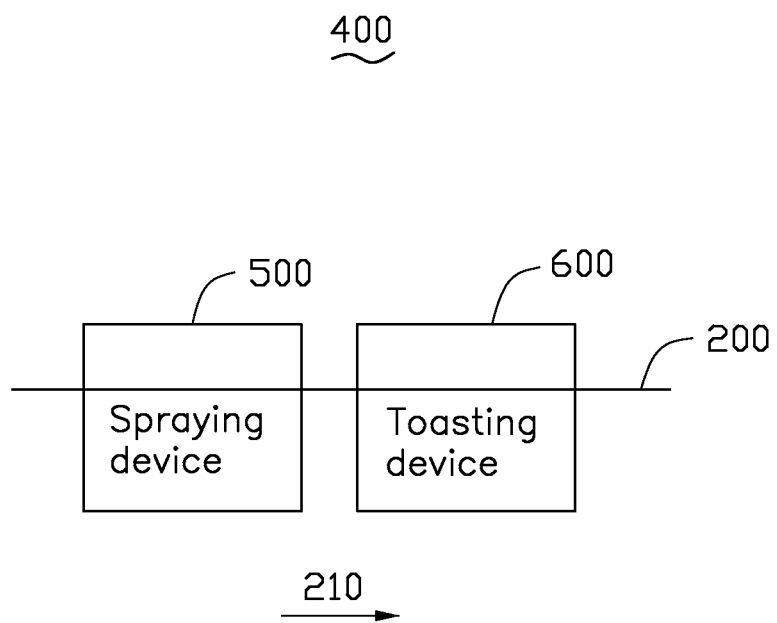
FIG. 1 is a block diagram of an embodiment of a spraying system including a turning device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is in relation to a spraying system. The spraying system can include a spraying device, a toasting device, a conveyor line, and a turning device. The spraying device can be configured to spray a workpiece. The toasting device can be configured to toast the workpiece. The conveyor line can pass through the spraying device and the toasting device and configured to convey the workpiece. The turning device can be coupled to the conveyor line and include a first fixing frame across the conveyor line, a turning mechanism, and a blocking member. The turning mechanism can include a bearing frame detachably coupled to the conveyor line, a rotation shaft rotatably coupled to the bearing frame; a rotatable member coupled to the rotation shaft; and a positioning member coupled to the rotation shaft and configured to couple the workpiece. The blocking member can be coupled to the fixing frame and configured to block the rotatable member to rotate the rotation shaft, the positioning member, and the workpiece.

FIG. 1 illustrates an embodiment of a spraying system 400, which can include a spraying device 500 and a toasting device 600. A conveyor line 200 can pass through the spraying device 500 and the toasting device 600 and configured to convey workpieces to the spraying device 500 and the toasting device 600. A convey direction of the conveyor line 200 can be shown as an arrow 210. Thus, the conveyor line 200 can convey the workpieces 300 to the spraying device 500 first, and then convey the workpieces from the spraying device 500 to the toasting device 600. The spraying device 500 can be configured to spray the workpieces. The toasting device 600 can be configured to toast the workpieces. The workpieces can be conveyed to the spraying device 500 to be sprayed, and then conveyed to the toasting device 600 to be toasted.

Figure 2:
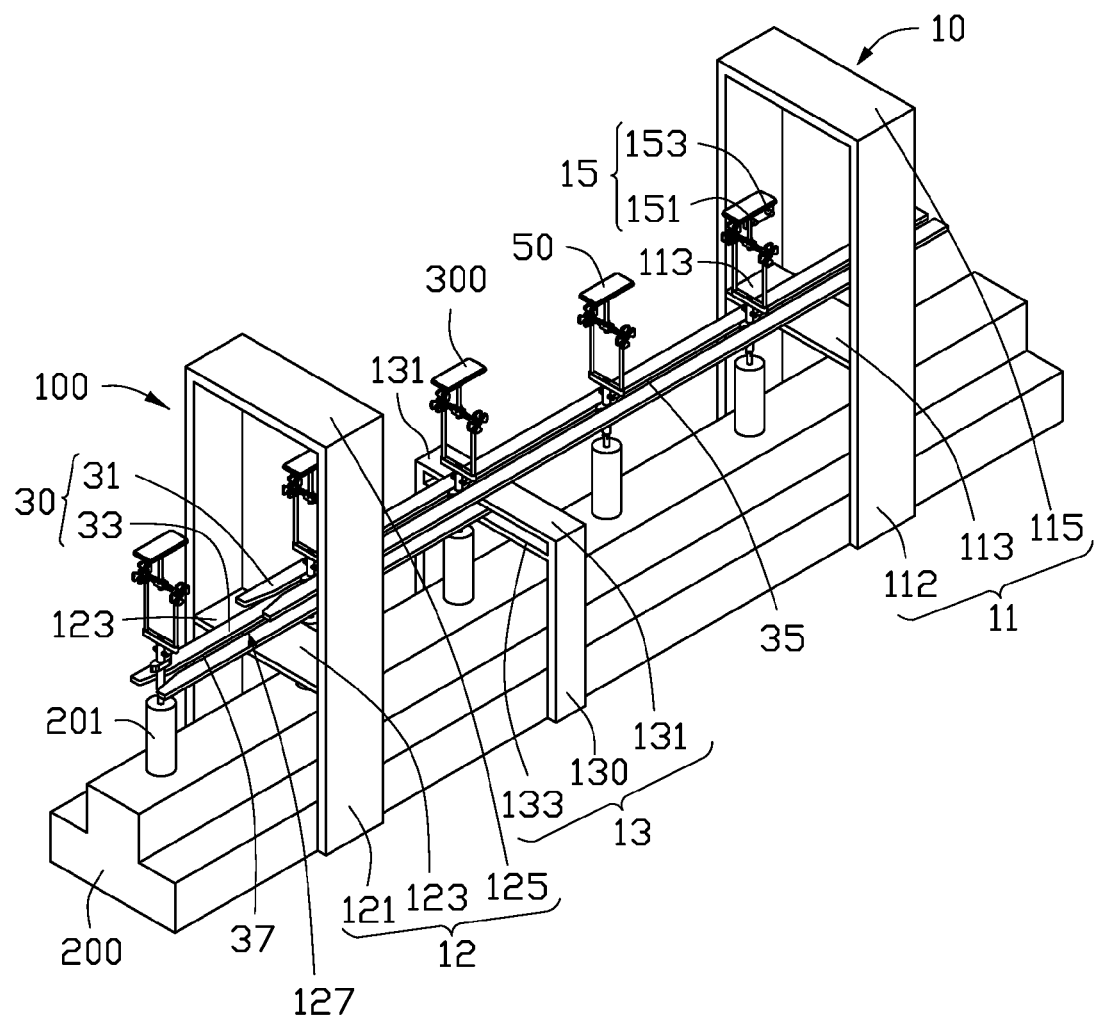
FIG. 2 is a partial, isometric view of the spraying system of FIG. 1.

FIG. 2 illustrates that a plurality of automatic turning device 100 can be coupled to the conveyor line 200. Each turning device 100 can be configured to hold and turn a workpiece 300. A plurality of the fixing members 201 can protrude from the conveyor line 200 and arranged in a straight line. Each turning device 100 can include a fixing assembly 10, a guiding assembly 30, and a plurality of turning mechanisms 50. The fixing assembly 10 can across the conveyor line 200. The guiding assembly 30 can be mounted on the fixing assembly 10. The turning mechanisms 50 can be detachably and rotatably coupled to the corresponding fixing members 201 of the conveyor line 200. The guiding assembly 30 can be configured to guide the turning mechanisms 50. The fixing assembly 10 can be configured to cooperate with the turning mechanisms 50 to turn the workpieces 300.

The fixing assembly 10 can include a first fixing frame 11, a second fixing frame 12, two support frames 13, and two blocking members 15. The first fixing frame 11 and the second fixing frame 12 both are substantially U-shaped and respectively across the conveyor line 200. The first fixing frame 11 and the second fixing frame 12 can be substantially vertically positioned and substantially perpendicular to the conveyor line 200. In at least one embodiment, the fixing assembly 10 can be received in the toasting device 600.

The first fixing frame 11 can include a pair of side plates 112, a pair of support portions 113, and a top plate 115. The pair of side plates 112 can be substantially parallel to each other and respectively positioned at opposite sides of the conveyor line 200. The pair of support portions 113 can be respectively protrude from the corresponding side plates 112 and positioned between the pair of side plates 112. The support portions 113 can be coplanar with each other and substantially perpendicular to the side plates 112. A gap 117 can be defined between the support portions 113. The top plate 115 can be coupled to the side plates 112 and positioned above the support portions 113.

A structure of the second fixing frame 12 can be substantially similar as that of the first fixing frame 11. The first fixing frame 12 can include a pair of side plates 121, a pair of support portions 123, and a top plate 125. The pair of side plates 121 can be substantially parallel to each other and respectively positioned at opposite sides of the conveyor line 200. The pair of support portions 123 can be respectively protrude from the corresponding side plates 121 and positioned between the pair of side plates 121. The support portions 123 can be coplanar with each other and substantially perpendicular to the side plates 121. A gap 127 can be defined between the support portions 123. The top plate 125 can be coupled to the side plates 121 and positioned above the support portions 123. In at least one embodiment, the support portions 113 can be higher than the support portions 123. The support portions 113 and the support portions 123 can be positioned above the conveyor line 200.

The support frames 13 can be positioned between the first fixing frame 11 and the second fixing frame 12, and respectively positioned at opposite sides of the conveyor line 200. The support frames 13 both can be substantially F-shaped and face to each other. Each support frame 13 can include a stand 130, a first support portion 131, and a second support portion 133. The first support portion 131 and the second support portion 133 can protrude from the stand 130 and positioned above the conveyor line 200. The first support portion 131 and the second support portion 133 both can be parallel to the conveyor line 200. The first support portions 131 of the support frames 13 can be coplanar to the support portion 113 of the first fixing frame 11. The second support portions 133 of the support frames 13 can be coplanar to the support portion 123 of the second fixing frame 12.

The blocking members 15 can be respectively coupled to an inner sidewall of the corresponding side plate 112 of the first fixing frame 11. The blocking members 15 can be positioned above the support portion 113. Each blocking member 15 can include a first blocking post 151 and a second blocking post 153 arranged apart. A distance between the first blocking post 151 and the conveyor line 200 can be substantially equal to a distance between the second blocking post 153 and the conveyor line 200.

The guiding assembly 30 can include a pair of first guiding rods 31 and a pair of second guiding rods 33 corresponding to the pair of first guiding rods 31. Each first guiding rod 31 can be supported by the corresponding support portion 113 of the first fixing frame 11 and the first support portion 131 of the corresponding support frame 13. The first guiding rods 31 can be coplanar to each other and parallel to the conveyor line 200. A guiding slot 35 can be defined between the first guiding rods 31 and positioned above the gap 117. Each second guiding rod 33 can be supported by the corresponding support portion 123 of the second fixing frame 12 and the second support portion 133 of the corresponding support frame 13. The second guiding rods 33 can be coplanar to each other and parallel to the conveyor line 200. A guiding slot 37 can be defined between the second guiding rods 33 and positioned above the gap 127. The guiding slot 35 can be positioned above the guiding slot 37 and communicate with the guiding slot 37.

Figure 3:
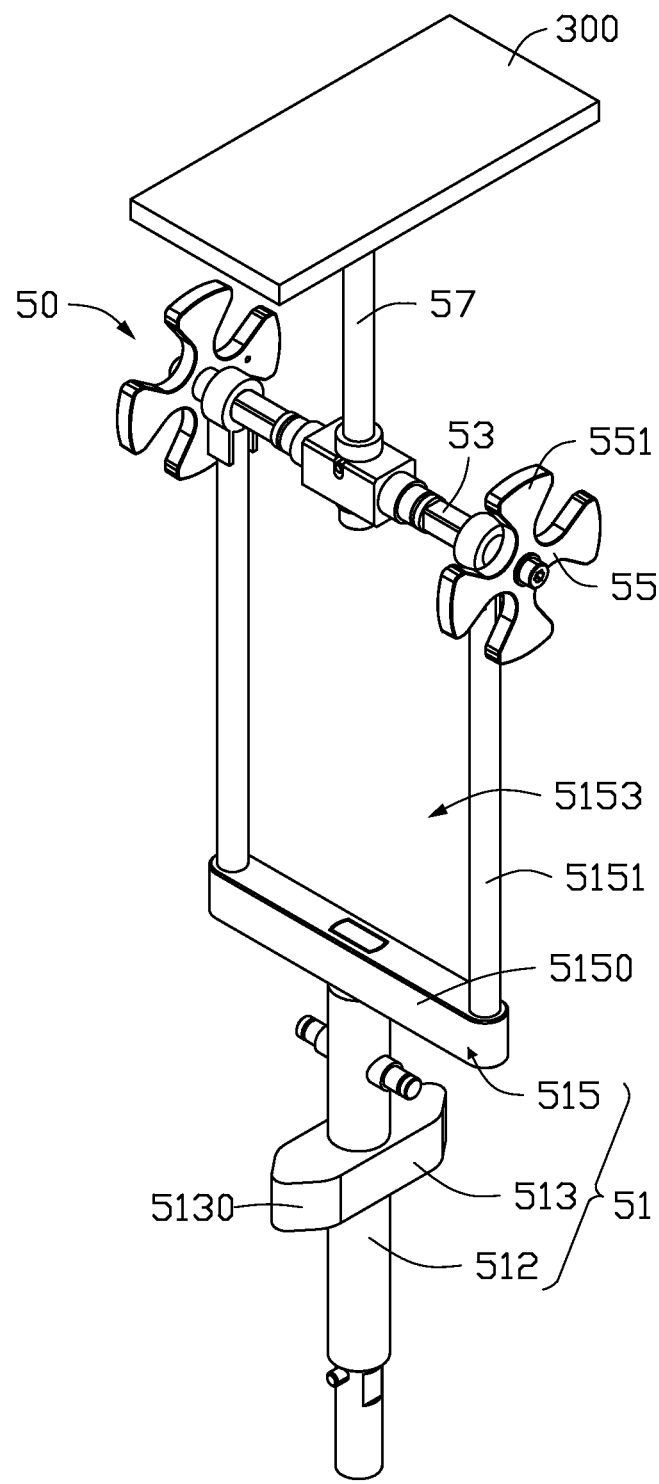
FIG. 3 is a partial, isometric view of the turning device of FIG. 2.

FIG. 3 illustrates that each turning mechanism 50 can include a bearing frame 51, a rotation shaft 53, two rotatable members 55, and a positioning member 57. The bearing frame 51 can be detachably coupled to the corresponding fixing member 201 of the conveyor line 200. The bearing frame 51 can include a support rod 512, a guiding member 513, and a bearing member 515. The support rod 512 can be detachably coupled to the corresponding fixing member 201 of the conveyor line 200. Thus, the conveyor line 200 can move the turning mechanism 50 along the guiding slot 37 and the guiding slot 35. The guiding member 513 can be substantially in a shape of a bar and sleeved on the support rod 512. The guiding member 513 can include two sharp end portions 5130 to convenient for the guiding member 513 inserting into the guiding slot 37 and the guiding slot 35.

The bearing member 515 can be substantially U-shaped and include a coupling rod 5150 and a pair of bearing rods 5151 coupled to the coupling rod 5150. The coupling rod 5150 and the bearing rods 5151 can cooperatively define a turning space 5153. The pair of bearing rods 5151 can be substantially perpendicular to the coupling rod 5150. The coupling rod 5150 can be substantially horizontal and perpendicular to the guiding member 513. When the guiding member 513 moves into the guiding slot 37, the coupling rod 5150 can be substantially perpendicular to the conveyor line 200 and the bearing rods 5151 can be substantially parallel to the side plates 112.

The rotation shaft 53 can be rotatably coupled to the bearing rods 5151 and define a substantially rectangular frame cooperate with the coupling rod 5150 and the bearing rods 5151. The rotatable members 55 can be respectively coupled to opposite distal ends of the rotation shaft 53 and positioned outside of the turning space 5153. In at least one embodiment, the rotatable member 55 can be substantially in a shape of a fan. Each rotatable member 55 can include a plurality of vanes 551 arranged apart. When the guiding member 513 is positioned between the first guiding rods 31, the rotatable members 55 can be parallel to the side plates 112 and the side plates 121.

The positioning member 57 can be coupled to a middle portion of the rotation shaft 53 and substantially perpendicular to the rotation shaft 53. The positioning member 57 can be configured to couple the workpiece 300. The first blocking post 151 and the second blocking post 153 can be configured to respectively block the corresponding vane 551. Thus, the rotatable members 55 can rotate the rotation shaft 53 relative to the bearing frame 51.

Referring to FIGS. 1-2 again, when in use, workpieces 300 can be coupled to the corresponding positioning member 57 of the turning mechanisms 50. The conveyor line 200 can move the turning mechanisms 50 to the spraying device 500. The turning mechanisms 50 can rotate around the support rod 512 and the spraying device 500 can spray paint to the workpieces 300.

Figure 4:
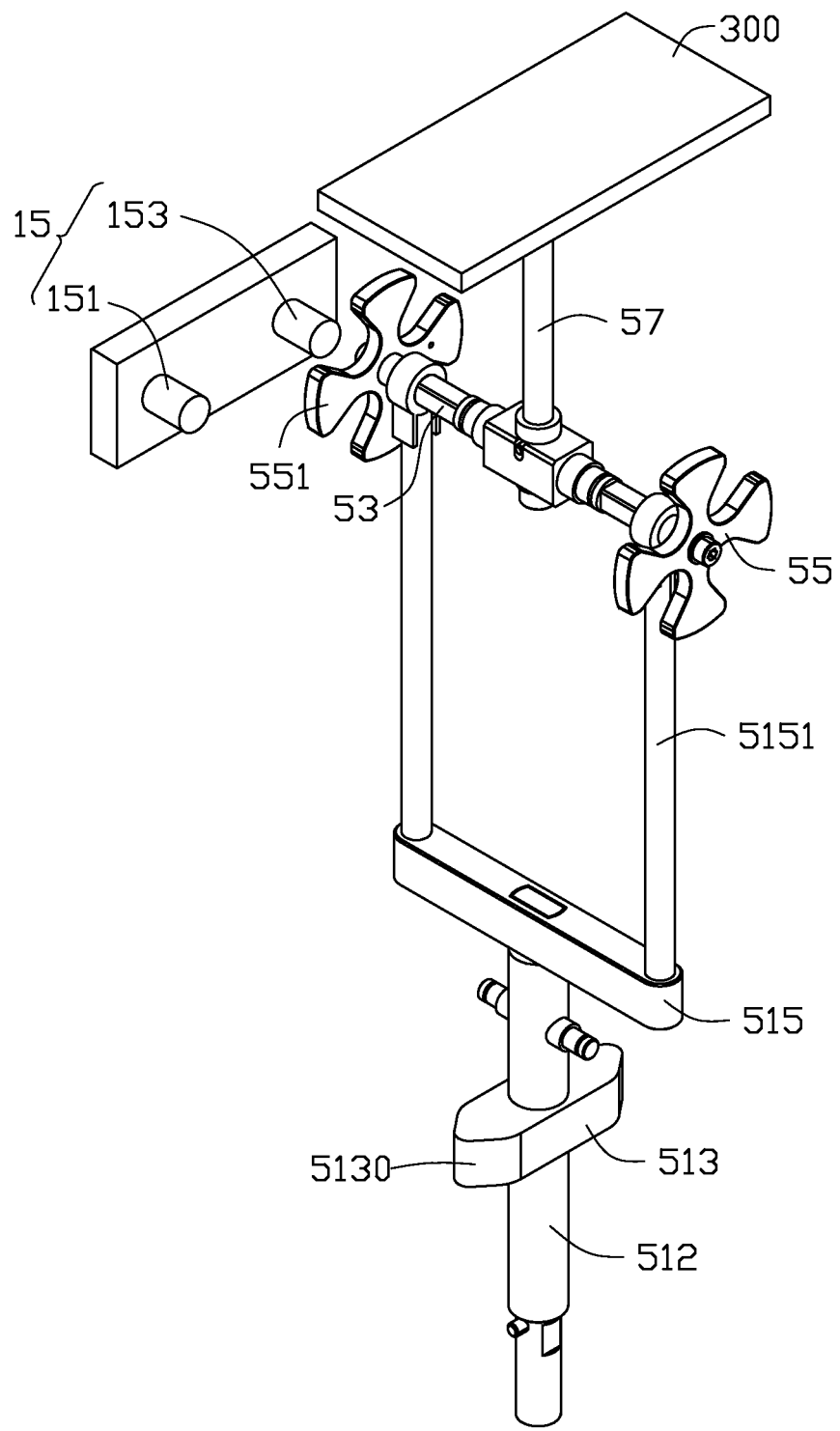
FIG. 4 is a partial, isometric view of the turning device of FIG. 2 in a first use state.
Figure 5:
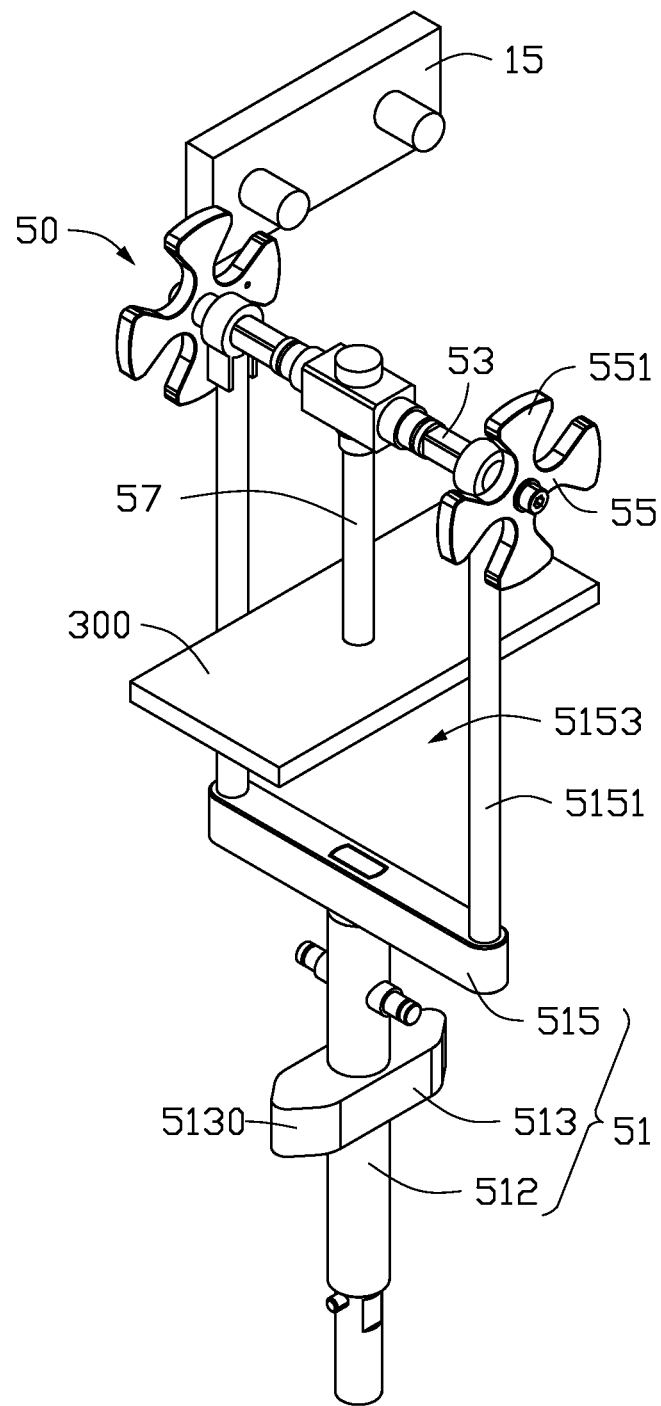
FIG. 5 is a partial, isometric view of the turning device of FIG. 2 in a second use state.

The conveyor line 200 can continually convey the turning mechanisms 50 and the workpieces 300 to the toasting device 600. The guiding member 513 can be sandwiched between the first guiding rods 31 to limit a rotation of the support rod 512. The first blocking post 151 can block one of the vane 551 to rotate the rotation shaft 53 and the positioning member 57 in a 90 degrees (shown in FIG. 4). Then, the second blocking post 151 can block the vane 551 to rotate the rotation shaft 53 and the positioning member 57 in another 90 degrees (shown in FIG. 5). The corresponding workpiece 300 can be rotated together with the positioning member 57 and received in the turning space 5153. In at least one embodiment, a number of the first fixing frame 11 can be more than two, which enable the workpieces 200 to rotate more than 180 degrees. Thus, the print on the workpieces 300 can be more even.

In at least one embodiment, a number of the vane 551, the rotatable member 55, and the blocking member 15 can be designed as needed. The guiding assembly 30, the second fixing frame 12, and the support frames 13 can be omitted.

The embodiments shown and described above are only examples. Many details are often found in the art such as the other features of a spraying system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A spraying system comprising:
    a spraying device, the spraying device configured to spray a workpiece;
    a toasting device, the toasting device configured to toast the workpiece;
    a conveyor line, the conveyor line passing through the spraying device and the toasting device and being configured to convey the workpiece; and
    a turning device, the turning device coupled to the conveyor line and comprising:
        a first fixing frame across the conveyor line,
        a second fixing frame across the conveyor line and spaced from the first fixing frame;
        a turning mechanism, the turning mechanism comprising:
            a bearing frame detachably coupled to the conveyor line;
            a rotation shaft rotatably coupled to the bearing frame;
            a rotatable member coupled to the rotation shaft; and
            a positioning member coupled to the rotation shaft and configured to couple the workpiece,
        a blocking member, the blocking member coupled to the first fixing frame and configured to block the rotatable member to rotate the rotation shaft, the positioning member, and the workpiece; and
        a guiding assembly, the guiding assembly comprising:
            a pair of first guiding rods supported by the first fixing frame and parallel to each other, and
            a pair of second guiding rods corresponding to the pair of first guiding rods and supported by the second fixing frame, the pair of second guiding rods being parallel to each other.

2. The spraying system of claim 1, wherein the rotatable member comprises at least two vanes, the blocking member comprises a first blocking post and a second blocking post arranged apart, the first blocking post and the second blocking post are configured to respectively block the at least two vanes to rotate the rotation shaft and the positioning member.

3. The spraying system of claim 1, wherein the bearing frame comprises a bearing member, the rotation shaft is rotatably coupled to the bearing member.

4. The spraying system of claim 1, wherein the bearing frame further comprises:
    a support rod detachably coupled to the conveyor line, and
    a guiding member sleeved on the support rod, the guiding member is configured to be sandwiched between the pair of first guiding rods to guide the bearing frame.

5. The spraying system of claim 4, wherein the first fixing frame comprises a pair of side plates substantially parallel to each other and respectively positioned at opposite sides of the conveyor line, the blocking member is coupled to one of the pair of side plates, and a pair of support portions each of which respectively protrude from the corresponding side plate and are positioned between the pair of side plates, the pair of first guiding rods is respectively supported by the pair of support portions of the first fixing frame.

6. The spraying system of claim 5, wherein the second fixing frame comprises a pair of side plates parallel to each other and respectively positioned at opposite sides of the conveyor line, and a pair of support portions each of which respectively protrude from the corresponding side plates and are positioned between the pair of side plates, the pair of second guiding rods is supported by the pair of support portions of the second fixing frame.

7. The spraying system of claim 6, wherein the turning mechanism further comprises two support frames positioned between the first fixing frame and the second fixing frame, and respectively positioned at opposite sides of the conveyor line, the pair of first guiding rods and the pair of second guiding rods are respectively supported by the two support frames.

8. The spraying system of claim 7, wherein each support frame comprises:
    a stand,
    a first support portion, the first support portion protruding from the stand, and
    a second support portion, the second support portion protruding from the stand and substantially parallel to the first support portion, the first support portions of the support frames are coplanar to the support portion of the first fixing frame, the second support portions of the support frames are coplanar to the support portion of the second fixing frame, the pair of support portions of the first fixing frame is higher than the pair of support portions of the second fixing frame.

9. The spraying system of claim 8, wherein each support frame is substantially F-shaped, the first support portion and the second support portion are positioned above the conveyor line.

10. The spraying system of claim 1, wherein the first fixing frame is received in the toasting device.

11. A turning device coupled to a conveyor line, the turning device comprising:
    a first fixing frame, the first fixing frame positioned across the conveyor line;
    a second fixing frame, the second fixing frame positioned across the conveyor line and spaced from the first fixing frame;
    a turning mechanism, the turning mechanism comprising:
        a bearing frame,
        a rotation shaft, the rotation shaft rotatably coupled to the bearing frame,
        a rotatable member, the rotatable member coupled to the rotation shaft, and
        a positioning member, the position member coupled to the rotation shaft and configured to couple a workpiece;
    a blocking member, the blocking member coupled to the first fixing frame and configured to block the rotatable member to rotate the rotation shaft, the positioning member, and the workpiece; and
    a guiding assembly, the guiding assembly comprising:
        a pair of first guiding rods supported by the first fixing frame and parallel to each other, and a pair of second guiding rods corresponding to the pair of first guiding rods and supported by the second fixing frame, the pair of second guiding rods being parallel to each other.

12. The turning device of claim 11, wherein the rotatable member comprises at least one vane, the blocking member comprises a first blocking post and a second blocking post arranged apart, the first blocking post and the second blocking post are configured to respectively block the at least one vane to rotate the rotation shaft and the positioning member.

13. The turning device of claim 11, wherein the bearing frame comprises a bearing member, the rotation shaft is rotatably coupled to the bearing member, the bearing frame defines a substantially rectangular frame cooperating with the rotation shaft.

14. The turning device of claim 13, wherein the bearing frame further comprises a support rod detachably coupled to the conveyor line and a guiding member sleeved on the support rod, and the bearing member is coupled to the support rod.

15. The turning device of claim 14, wherein the guiding member is substantially in a shape of a bar.

16. The turning device of claim 14, wherein the guiding member comprises two sharp end portions.

* * * * *